(12) United States Patent
Matsumoto et al.

(10) Patent No.: US 10,199,891 B2
(45) Date of Patent: Feb. 5, 2019

(54) ROTOR HAVING END PLATES AND MOLDING FLASH

(71) Applicant: TOYOTA JIDOSHA KABUSHIKI KAISHA, Toyota-shi, Aichi-ken (JP)

(72) Inventors: Masashi Matsumoto, Nagoya (JP); Takahiro Yoneda, Okazaki (JP); Yasuaki Shirasaki, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 212 days.

(21) Appl. No.: 15/184,579

(22) Filed: Jun. 16, 2016

(65) Prior Publication Data

US 2016/0380493 A1  Dec. 29, 2016

(30) Foreign Application Priority Data

Jun. 23, 2015 (JP) ................................ 2015-125495

(51) Int. Cl.
*H02K 1/27* (2006.01)
*H02K 1/28* (2006.01)
*H02K 15/12* (2006.01)

(52) U.S. Cl.
CPC .......... *H02K 1/2766* (2013.01); *H02K 15/12* (2013.01)

(58) Field of Classification Search
CPC .............................. H02K 1/2766; H02K 15/12
USPC ........................ 310/156.21, 156.53, 156.56
See application file for complete search history.

(56) References Cited

U.S. PATENT DOCUMENTS

| | | | | |
|---|---|---|---|---|
| 2008/0238219 A1* | 10/2008 | Hoshino | ................. | H02K 1/274 310/400 |
| 2009/0045689 A1* | 2/2009 | Haruno | .................. | H02K 1/276 310/156.56 |
| 2010/0001606 A1* | 1/2010 | Ogami | ................. | H02K 1/2766 310/156.53 |
| 2012/0139377 A1* | 6/2012 | Kim | ........................ | H02K 1/276 310/156.21 |
| 2013/0334907 A1* | 12/2013 | Ikuta | .................... | H02K 1/2706 310/45 |
| 2014/0077652 A1* | 3/2014 | Yamagishi | ............ | H02K 1/2766 310/156.21 |
| 2015/0061445 A1* | 3/2015 | Ishimatsu | .............. | H02K 1/276 310/156.21 |
| 2015/0130318 A1* | 5/2015 | Kitada | .................... | C08L 63/00 310/156.21 |
| 2015/0357871 A1* | 12/2015 | Kim | ........................ | H02K 1/28 310/51 |
| 2016/0380493 A1* | 12/2016 | Matsumoto | .......... | H02K 1/2766 310/156.21 |

FOREIGN PATENT DOCUMENTS

| | | |
|---|---|---|
| CN | 103490539 A | 1/2014 |
| JP | 2007-236019 A | 9/2007 |
| JP | 2008-054376 A | 3/2008 |
| JP | 2013-258850 A | 12/2013 |
| JP | 2015-042028 A | 3/2015 |
| KR | 10-2012-0060070 A | 6/2012 |

* cited by examiner

*Primary Examiner* — John K Kim
(74) *Attorney, Agent, or Firm* — Sughrue Mion, PLLC (57) ABSTRACT

A rotor includes: a rotor core; magnets disposed in housing holes having openings in end faces of the rotor core; a filler injected through the openings into the housing holes; and end plates fixed to the end faces. The end plates have recesses at positions facing inlets of the filler.

4 Claims, 7 Drawing Sheets

ROTOR HAVING END PLATES AND MOLDING FLASH

INCORPORATION BY REFERENCE

The disclosure of Japanese Patent Application No. 2015-125495 filed on Jun. 23, 2015 including the specification, drawings and abstract is incorporated herein by reference in its entirety.

BACKGROUND OF THE INVENTION

1. Field of the Invention

The present invention relates to a rotor, and more particularly to a rotor of a rotating electrical machine in which magnets are fixed to a rotor core by resin molding.

2. Description of Related Art

A rotating electrical machine includes a stator and a rotor, and examples of the rotor include magnet-embedded rotors in which magnets are embedded in an outer peripheral part. Among such magnet-embedded rotors, some are configured by inserting magnets into housing holes that are open in end faces of the rotor core and extend in the axial direction inside the rotor core, packing a resin into each gap between the inner peripheral surface of the housing hole and the magnet, and then fixing end plates to the end faces of the rotor core (e.g., see Japanese Patent Application Publication No. 2007-236019).

In such a rotor, a protrusion may be formed on the end face of the rotor after the packing of the resin as the resin remains and becomes a molding flash at an inlet through which the resin has been injected into the housing hole. If one tries to fix the end plate to the end face of the rotor core without removing such molding flash, adhesion of the end face of the rotor core and the end plate to each other is hindered by the molding flash. This is why deflashing work of removing molding flash is performed to remove any molding flash before the end plate is fixed to the end face of the rotor core.

However, thus performing molding flash removing work can add to the manufacturing cost. On the other hand, a manufacturing method in which the end plate is provided with an inlet port, the end plate is fixed to the rotor core, and then the rotor core is set in a mold and injected with a filler is also known as a technique to make the end face of the rotor core and the end plate adhere to each other. Since the end plate may deform under load and heat during molding in this manufacturing method, it is necessary to increase the plate thickness of the end plate so as to withstand load and heat. However, increasing the plate thickness incurs an iron loss and results in a decrease in efficiency of the rotating electrical machine.

SUMMARY OF THE INVENTION

Therefore, the present invention provides a rotor in which, without the need for deflashing work, adhesion of the rotor core and the end plate to each other can be prevented from being inhibited.

A rotor according to one aspect of the present invention is a rotor in which magnets are inserted into housing holes having openings in end faces of a rotor core, and end plates are fixed to the end faces after a filler injected through the openings into the housing holes has cured inside the housing holes, wherein the end plates have recesses at positions facing inlets of the filler. In such a rotor, even if there is a molding flash at the inlet, the molding flash enters the recess of the end plate when the end plate is fixed, so that adhesion of the rotor core and the end plate to each other can be prevented from being inhibited.

The internal dimension of the recess may be larger than the external dimension of a filler flash formed at the inlet, and the depth of the recess may be larger than the raised height of the filler flash. In such a rotor, the entire molding flash reliably enters the recess of the end plate, so that the rotor core and the end plate can be made to adhere to each other.

The internal dimension of the recess may be smaller than the internal dimension of the opening. In such a rotor, there are some positions in the opening at which the end plate is in contact with the end face of the rotor core, so that the magnet and the filler inside the housing hole can be prevented from detaching in the rotor axial direction.

A rotor according to another aspect of the present invention is a rotor in which magnets are inserted into housing holes having openings in end faces of a rotor core, and end plates are fixed to the end faces after a filler injected through the openings into the housing holes has cured inside the housing holes, wherein the end plates have through-holes at positions facing inlets of the filler. In such a rotor, even if there is a molding flash at the inlet, the molding flash enters the through-hole of the end plate when the end plate is fixed, so that adhesion of the rotor core and the end plate to each other can be prevented from being inhibited. Moreover, even when it is difficult to form a recess of a sufficient depth in the end plate due to the thinness of the end plate etc., adhesion of the rotor core and the end plate to each other can be prevented from being inhibited.

The internal dimension of the through-hole may be larger than the external dimension of a filler flash formed at the inlet. In such a rotor, the entire molding flash reliably enters the through-hole of the end plate, so that the rotor core and the end plate can be made to adhere to each other.

The internal dimension of the through-hole may be smaller than the internal dimension of the opening. In such a rotor, there are some positions in the opening at which the end plate is in contact with the end face of the rotor core, so that the magnet and the filler inside the housing hole can be prevented from detaching in the rotor axial direction.

According to the above aspects of the present invention, it is possible to avoid the additional cost of deflashing work as well as to prevent adhesion of the rotor core and the end plate to each other from being inhibited.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
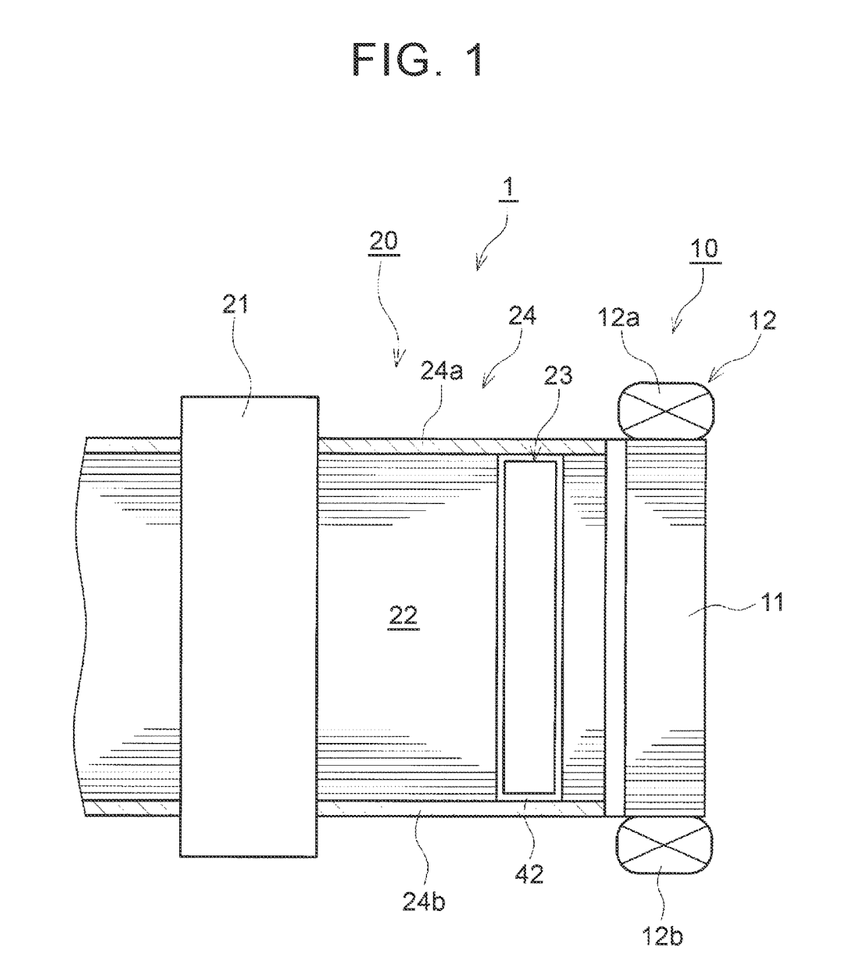
FIG. 1 is a sectional view showing the schematic configuration of a rotating electrical machine.

First, a first embodiment will be described. A rotating electrical machine 1 in the embodiments of the present invention is a motor generator that is installed, for example, in a hybrid electric vehicle or an electric vehicle. As shown in FIG. 1, the rotating electrical machine 1 includes an annular stator 10 and a rotor 20 disposed inside the stator 10. A predetermined amount of gap is formed between an inner peripheral surface of the stator 10 and an outer peripheral surface of the rotor 20.

The stator 10 includes a stator core 11 being a cylindrical magnetic substance, and stator coils 12 wound around a plurality of teeth that protrude from an inner peripheral part of the stator core 11 and are disposed at regular intervals in the circumferential direction. The stator core 11 is configured by stacking a large number of magnetic steel sheets, each punched into a substantially annular shape, in the axial direction and integrally coupling together the magnetic steel sheets. The stator coil 12 includes coil ends 12a, 12b protruding outward from end faces in the axial direction of the stator core 11.

The rotor 20 includes a rotating shaft 21, a cylindrical rotor core 22 fixed to the outer periphery of the rotating shaft 21, a plurality of magnetic poles 23 embedded in the rotor core 22 in the circumferential direction, and end plates 24 fixed to both end faces of the rotor core 22. The end plates 24 include an end plate 24a fixed to one end face of the rotor core 22 and an end plate 24b fixed to the other end face of the rotor core 22.

The rotor core 22 is configured by stacking in the axial direction a large number of magnetic steel sheets each punched into an annular shape. The magnetic steel sheets constituting the rotor core 22 are integrally coupled together by being collectively caulked, bonded, or welded, or by another method.

Figure 2:
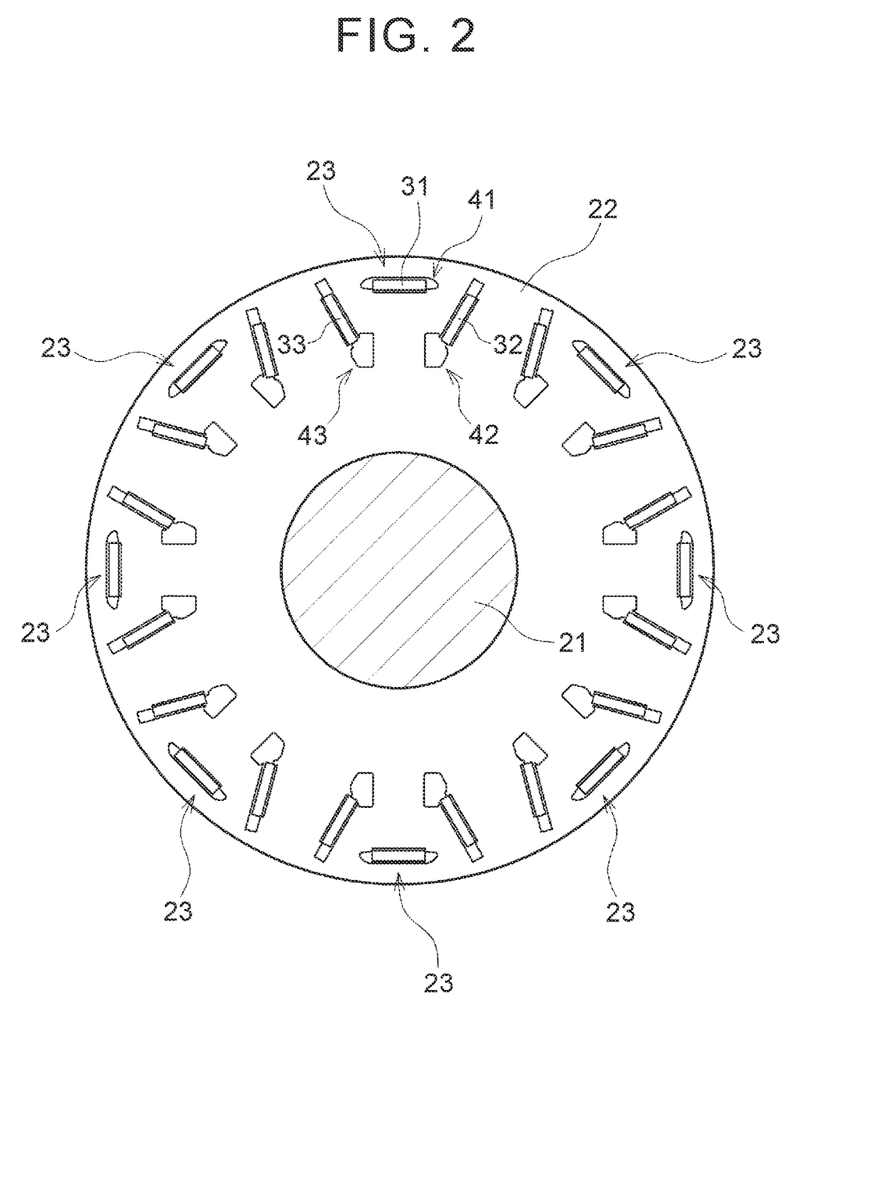
FIG. 2 is a sectional view of a rotor core.

As shown in FIG. 2, the rotor core 22 is provided with eight sets of magnetic poles 23 at regular intervals in the circumferential direction. As the magnetic poles 23 have the same configuration, one magnetic pole 23 will be described in the following. The magnetic pole 23 includes a permanent magnet 31 disposed along the outer periphery of the rotor core 22, and permanent magnets 32, 33 disposed on both sides of the permanent magnet 31 across the permanent magnet 31. The permanent magnets 32, 33 are disposed so as to splay in a substantially V-shape toward the outer peripheral side of the rotor core 22.

The permanent magnets 31, 32, 33 have the shape of a flat plate that is rectangular in section and long in the axial direction, and the length of the permanent magnets 31, 32, 33 is slightly shorter than the length in the axial direction of the rotor core 22. In this embodiment, the permanent magnets 31, 32, 33 are of the same shape and the same size, to which, however, the present invention is not limited; the permanent magnets 31, 32, 33 may be varied in shape and size on the basis of the specifications etc. of the rotor core 22.

Figure 3:
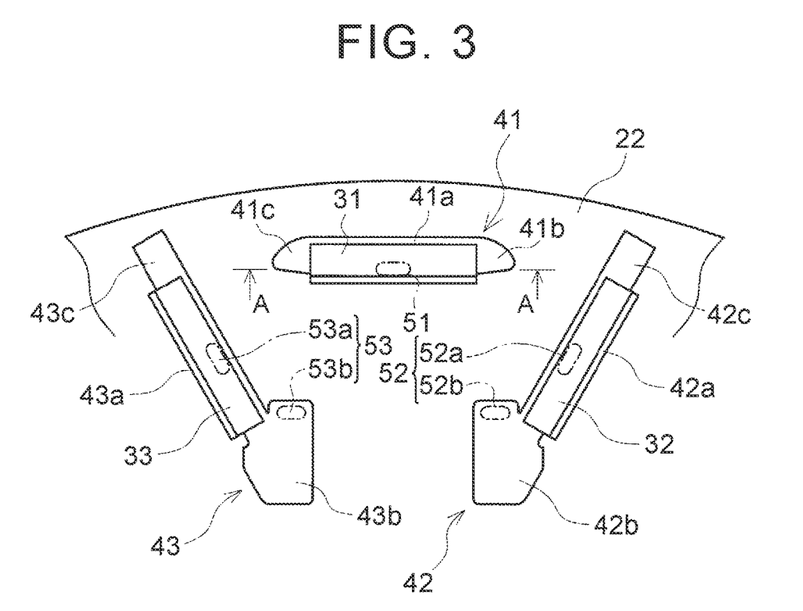
FIG. 3 is an enlarged view of an end face of the rotor core.

FIG. 3 is an enlarged view of a part of the rotor core 22 where one magnetic pole 23 is disposed in FIG. 2. As shown in FIG. 3, the rotor core 22 is provided with housing holes 41, 42, 43 into which the permanent magnets 31, 32, 33 are inserted. The housing holes 41, 42, 43 have openings in the end face of the rotor core 22 and extend in the axial direction of the rotor core 22.

First, the housing hole 41 will be described. The housing hole 41 includes a magnet holding part 41a in which the permanent magnet 31 is held, and pockets 41b, 41c communicating with both ends of the magnet holding part 41a. The magnet holding part 41a has a shape substantially similar to the cross-sectional shape of the permanent magnet 31. The pockets 41b, 41c are formed at both ends in the longitudinal direction of the magnet holding part 41a and symmetrical to each other in the left-right direction. Portions of the pockets 41b, 41c at which the pockets 41b, 41c communicate with the magnet holding part 41a are narrower than the magnet holding part 41a so that the permanent magnet 31 does not enter the pockets 41b, 41c.

As the housing holes 42, 43 are symmetrical to each other with respect to a center line passing the middle between the housing holes 42, 43, the housing hole 42 will be described while the housing hole 43 will be given corresponding reference signs and description thereof will be omitted. The housing hole 42 includes a magnet holding part 42a in which the permanent magnet 32 is held, and pockets 42b, 42c communicating with the magnet holding part 42a. The magnet holding part 42a has a rectangular shape substantially similar to but a little larger than the cross-sectional shape of the permanent magnet 32. On the inner side and the outer side from the magnet holding part 42a in the rotor core 22, the inner pocket 42b and the outer pocket 42c are respectively formed that communicate with the magnet holding part 42a and extend from the magnet holding part 42a in the radial direction of the rotor core 22. Portions of the pockets 42b, 42c at which the pockets 42b, 42c communicate with the magnet holding part 42a are narrower than the magnet holding part 42a so that the permanent magnet 32 does not enter the pockets 42b, 42c. The inner pocket 42b has a larger sectional area than the outer pocket 42c.

Figure 5:
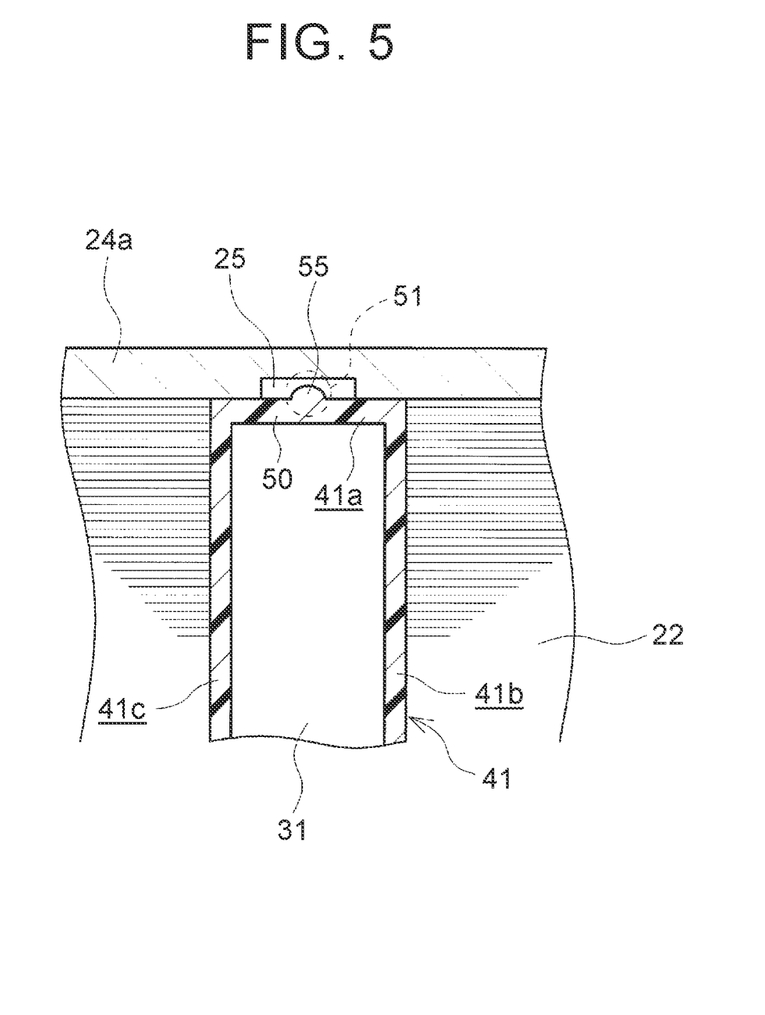
FIG. 5 is an enlarged sectional view of the vicinity of an inlet port in the section A-A of FIG. 3.

As shown in FIG. 5 that is a view of the section A-A of FIG. 3, the magnet holding part 41a is packed with a filler 50 that serves to fix the permanent magnet 31 inside the magnet holding part 41a. A thermosetting resin material, for example, epoxy resin or silicon resin, is used as the filler 50. The pockets 41b, 41c are also packed with the filler 50. As the filler 50 having been packed cures, the permanent magnet 31 is fixed in the magnet holding part 41a. That is, as the filler 50 having been packed into the housing hole 41 cures, the permanent magnet 31 is resin-molded and fixed inside the housing hole 41.

Figure 6:
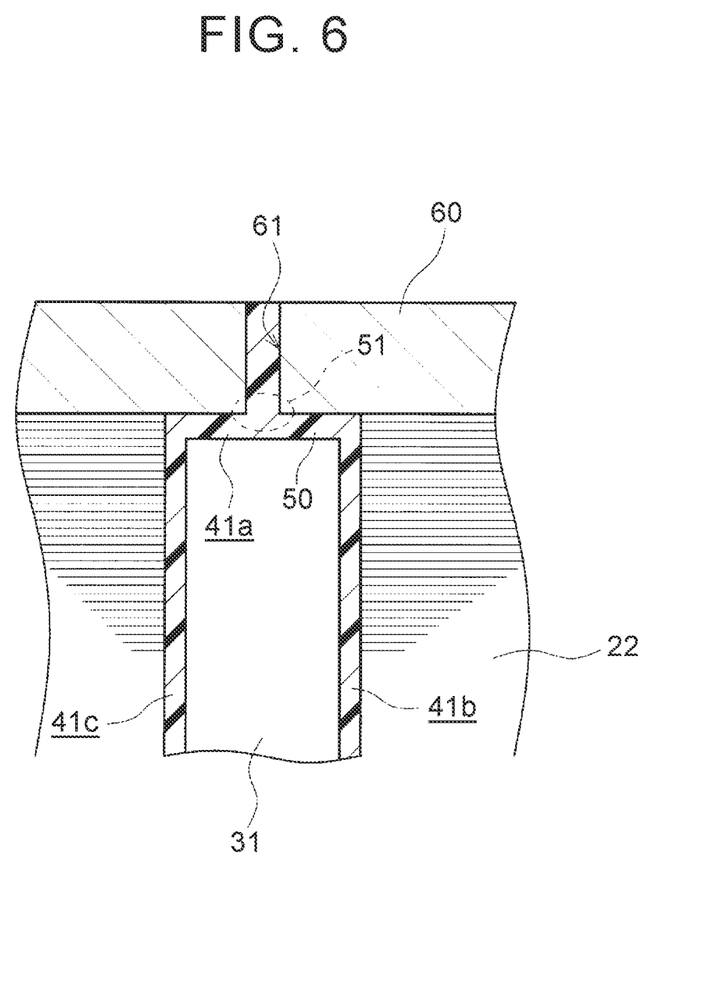
FIG. 6 is a schematic configurational view of a mold illustrating the injection of a filler.

As shown in FIG. 6, the filler 50 is supplied from a resin supply device (not shown) to an inlet port 61 of a mold 60, and is injected through the inlet port 61 into the magnet holding part 41a. A portion of the magnet holding part 41a at which the filler 50 is injected is an inlet 51. As shown in FIG. 3, the elliptical inlet 51 (indicated by the dot-and-dash line in FIG. 3) is located in a part corresponding roughly to the middle of the permanent magnet 31 and the magnet holding part 41a. The injection of the filler 50 using the mold 60 will be described in detail later.

Similarly, the permanent magnets 32, 33 are fixed in the magnet holding parts 42a, 43a, respectively, as the filler 50 is injected through the inlet port 61 of the mold 60 and cures in the magnet holding part 42a and the pocket 42b of the housing hole 42 and the magnet holding part 43a and the pocket 43b of the housing hole 43. The permanent magnets 32, 33 are also resin-molded and fixed inside the housing holes 42, 43.

As shown in FIG. 3, the filler 50 is injected into the housing hole 42 through an inlet 52 that includes an inlet 52a located roughly at the middle of the permanent magnet 32 and the magnet holding part 42*a* and an inlet 52*b* located at an end of the pocket 42*b*. The filler 50 is injected into the magnet holding part 42*a* through the inlet 52*a*, and the filler 50 is injected into the pocket 42*b* through the inlet 52*b*.

Similarly, the filler 50 is injected into the housing hole 43 through an inlet 53 that includes an inlet 53*a* located roughly at the middle of the permanent magnet 33 and the magnet holding part 43*a* and an inlet 53*b* located at an end of the pocket 43*b*. The filler 50 is injected into the magnet holding part 43*a* through the inlet 53*a*, and the filler 50 is injected into the pocket 43*b* through the inlet 53*b*.

Since the filler 50 is a thermosetting resin, when the filler 50 has been packed into the pockets 41*b*, 41*c*, 42*b*, 42*c*, 43*b*, 43*c*, the pockets 41*b*, 41*c*, 42*b*, 42*c*, 43*b*, 43*c* become regions having a lower magnetic permeability than the part of the rotor core 22 composed of the magnetic steel sheets. With the low-magnetic-permeability regions provided, it is possible to effectively prevent magnetic flux leakage and short-circuit between the front side and the rear side at the ends in the circumferential direction of the permanent magnets 31, 32, 33.

After the filler 50 has cured, the end plates 24*a*, 24*b* are respectively fixed to both end faces of the rotor core 22. The end plates 24*a*, 24*b* have the same annular shape as the end faces in the axial direction of the rotor core 22, and are formed of a metal sheet of stainless steel (SUS), for example. The end plates 24*a*, 24*b* are welded to the rotor core 22 at a plurality of positions at regular intervals in the outer periphery.

Figure 4:
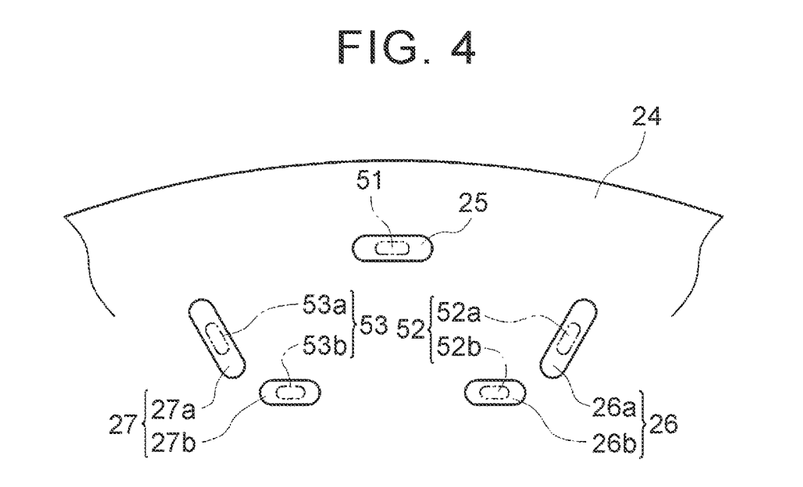
FIG. 4 is an enlarged view of an end face of an end plate.

As shown in FIG. 5, a molding flash 55 being a filler flash rising from the surface of the magnet holding part 41*a* may be formed as a slight amount of filler 50 remains at the inlet 51 after the packing of the filler 50. Therefore, as shown in FIG. 4, a recess 25 intended to avoid interference with the molding flash 55 formed at the inlet 51 is provided at a position facing the inlet 51 in the surface of the end plate 24*a* on which the end plate 24*a* is fixed to the rotor core 22. The recess 25 has an elongated circular shape along the longitudinal direction of the inlet 51.

As shown in FIGS. 4 and 5, the internal dimension of the recess 25 is set to be larger than the external dimension of the molding flash 55 formed at the inlet 51 and smaller than the internal dimension of the opening of the magnet holding part 41*a*. The depth of the recess 25 is set to be larger than the raised height of the inlet 51, i.e., the height of the molding flash 55. Thus, the recess 25 covers the molding flash 55 so as not to interfere with the molding flash 55.

The end plate 24*a* is further provided with recesses 26, 27 corresponding to the inlets 52, 53, respectively. The recess 26 includes recesses 26*a*, 26*b* corresponding to the inlets 52*a*, 52*b*. The recess 27 includes recesses 27*a*, 27*b* corresponding to the inlets 53*a*, 53*b*. The end plate 24*b* has the same configuration as the end plate 24*a*.

Figure 7:
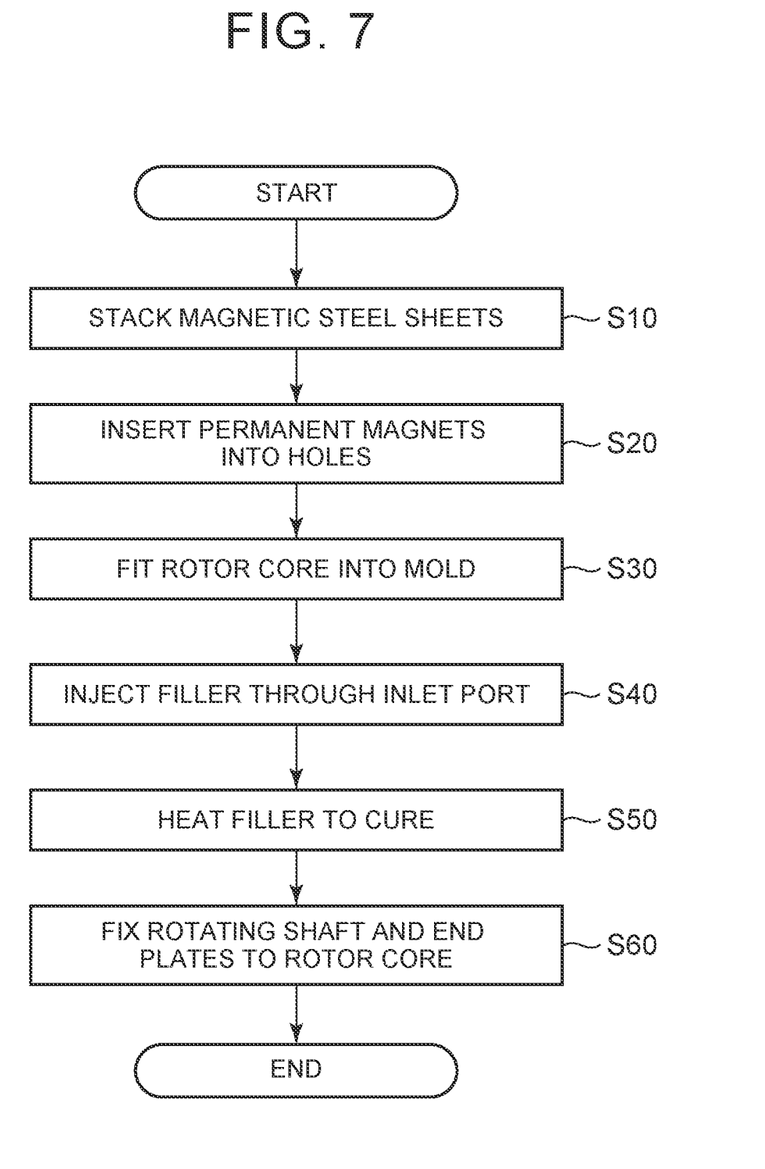
FIG. 7 is a flowchart illustrating a rotor core manufacturing method.

Next, a manufacturing method of the rotor 20 of this embodiment will be described with reference to FIGS. 6 and 7. FIG. 7 is a flowchart showing a manufacturing process of the rotor 20.

First, in step S10, a large number of magnetic steel sheets each punched into an annular shape are stacked in the axial direction, and the magnetic steel sheets are integrated by caulking, welding, bonding, etc. into a stack of magnetic steel sheets to form the rotor core 22.

Next, in step S20, the permanent magnets 31, 32, 33 are inserted into the housing holes 41, 42, 43 of the rotor core 22.

In step S30, the rotor core 22 with the permanent magnets 31, 32, 33 inserted therein is fitted into the mold 60. The mold 60 clamps the rotor core 22 from the upper side and the lower side.

In step S40, the filler 50 is injected through the inlet port 61 of the mold 60 etc. into the inlets 51, 52*a*, 53*a* of the magnet holding parts 41*a*, 42*a*, 43*a* and into the inlets 52*b*, 53*b* of the pockets 42*b*, 43*b* of the rotor core 22. As the filler 50 is injected, the filler 50 is packed into the magnet holding parts 41*a*, 42*a*, 43*a* and the pockets 41*b*, 41*c*, 42*b*, 42*c*, 43*b*, 43*c*, and the magnet holding parts and the pockets are filled with the filler 50. The filler 50 may be packed into the magnetic poles 23 one by one, or may be packed into the eight sets of magnetic poles 23 all at the same time.

Then, in step S50, the rotor core 22 is heated to cure the filler 50, and the permanent magnets 31, 32, 33 are fixed inside the housing holes 41, 42, 43 of the rotor core 22.

Thereafter, in step S60, the rotor core 22 is taken out of the mold 60. As shown in FIG. 5, when the mold 60 is removed, the molding flash 55 may be formed as a slight amount of filler 50 remains at the inlet 51 of the filler 50 in the magnet holding part 41*a* and the surface of the magnet holding part 41*a* is raised. It is possible to know the size and the raised height of the molding flash 55 by experiment etc. Accordingly, it is possible to know in advance to what size and depth the recess 25 of the end plate 24*a* should be set so as not to interfere with the molding flash 55. While a molding flash at the inlets 52, 53 is not shown, a molding flash is also formed at the inlets 52, 53 as at the inlet 51.

The rotating shaft 21 is fixed to the rotor core 22 with the molding flash 55 unremoved. Then, with the recess 25 of the end plate 24*a* facing the molding flash 55, the end plate 24*a* is fixed to the rotor core 22. Similarly, the end plate 24*b* is also fixed to the rotor core 22. This completes the manufacturing of the rotor 20.

As has been described above, in this embodiment, deflashing work of removing the molding flash 55 is not performed, so that the cost of deflashing work can be saved. Moreover, with the dimensions and the depth of the recess 25 of the end plate 24*a* set to be larger than the dimensions and the depth of the inlet 51 (molding flash 55), it is possible, when the end plate 24*a* is fixed to the end face of the rotor core 22, to avoid interference between the inlet 51 of the filler 50 (molding flash 55) and the end plate 24*a* and to fix the end plate 24*a* so as to adhere to the end face of the rotor core 22. The same applies to the end plate 24*b*. Furthermore, since the internal dimension of the recess 25 is set to be smaller than the internal dimension of the opening of the magnet holding part 41*a*, there are some positions in the opening at which the end plate 24*a* is in contact with the end face of the rotor core 22, so that the permanent magnets 31, 32, 33 and the filler 50 inside the housing holes 41, 42, 43 can be prevented from detaching in the axial direction of the rotor 20.

When deflashing work is not performed, the molding flash 55 may come off. If the molding flash 55 comes off, the molding flash 55 becomes a foreign object inside the rotating electrical machine 1. If the foreign object attaches to a rotating part, the operation of the rotating electrical machine 1 may be affected, and otherwise the foreign object may clog oil channels for cooling oil and lubricant circulating inside the rotating electrical machine 1. However, since the molding flash 55 is covered with the recess 25 of the end plate 24*a*, even if the molding flash 55 comes off, the molding flash 55 does not scatter into the rotating electrical machine 1 and therefore does not become a foreign object inside the rotating electrical machine 1.

Figure 8:
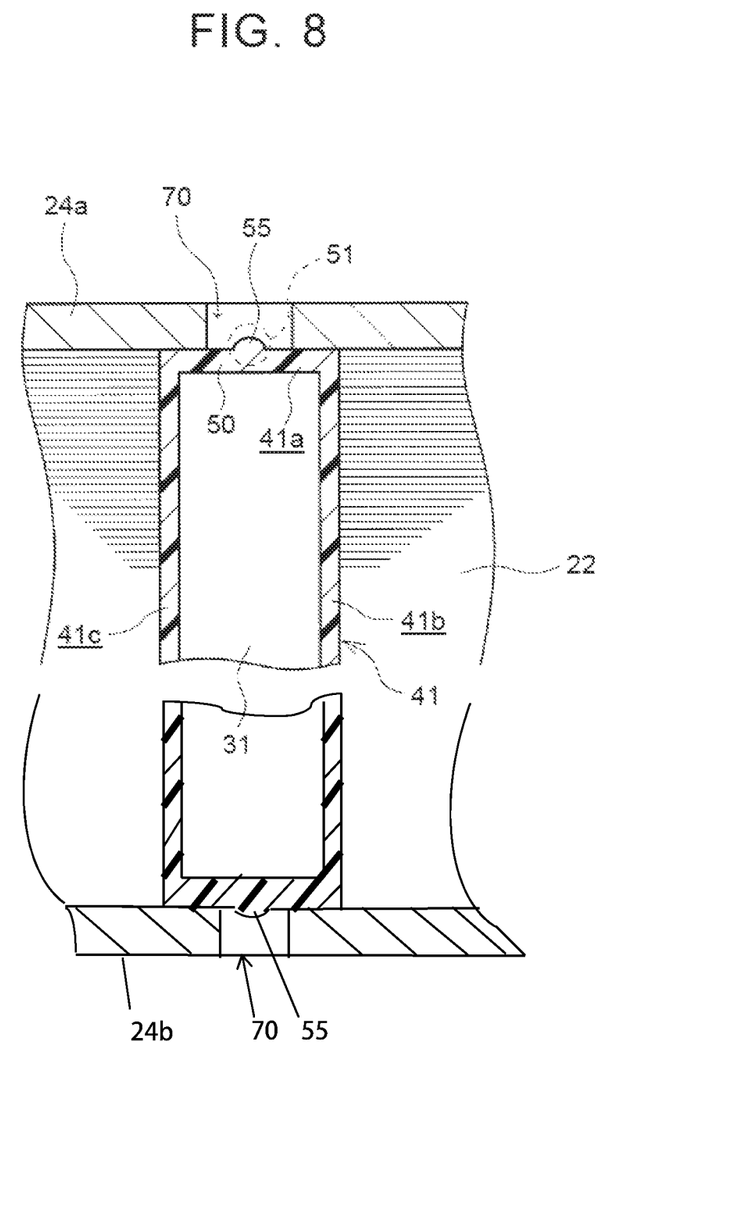
FIG. 8 is an enlarged sectional view of the vicinity of the inlet port showing a second embodiment.

Next, a second embodiment will be described. In the second embodiment, a through-hole 70 is provided instead of the recess 25. In particular, when the recess 25 is difficult to form due to the thinness of the end plate 24, it is preferable to form the through-hole 70.

Referring to FIG. 8, as described above, the molding flash 55 rising from the surface of the magnet holding part 41a may be formed as a slight amount of filler 50 remains at the inlet 51 after the filler 50 has been packed. Therefore, the circular through-hole 70 intended to avoid interference with the molding flash 55 formed at the inlet 51 is provided at a position facing the inlet 51 in the end plates 24a, 24b.

The internal dimension of the through-hole 70 is set to be larger than the external dimension of the molding flash 55 formed at the inlet 51 and smaller than the internal dimension of the opening of the magnet holding part 41a. While the through-hole 70 has a circular shape in the second embodiment, the through-hole 70 may have various shapes, such as a rectangular shape, a square shape, and an elongated circular shape, according to the shape of the molding flash 55. A circular hole is preferable from the viewpoint of the ease of machining.

Thus, when the end plates 24a, 24b provided with the through-holes 70 are fixed to the end faces of the rotor core 22, interference between the inlet 51 of the filler 50 (molding flash 55) and the end plates 24a, 24b can be avoided and the end plates 24a, 24b can be fixed so as to adhere to the end faces of the rotor core 22. Even when it is difficult to form the recess 25 as in the first embodiment due to the thinness of the end plate 24a employed etc., the end plate 24a can be fixed so as to adhere to the end face of the rotor core 22.

Moreover, it is possible to prevent interference with the molding flash 55 simply by adjusting the diameter of the through-hole 70. Thus, the machining of the end plates 24a, 24b is simplified and the machining cost can be reduced.

Furthermore, since the internal dimension of the through-hole 70 is set to be smaller than the internal dimension of the opening of the magnet holding part 41a, there are some positions in the opening at which the end plates 24a, 24b are in contact with the end faces of the rotor core 22, so that the permanent magnets 31, 32, 33 and the filler 50 inside the housing holes 41, 42, 43 can be prevented from detaching in the axial direction of the rotor 20.

What is claimed is:

1. A rotor comprising:
   a rotor core;
   magnets disposed in housing holes having openings in end faces of the rotor core;
   a filler injected through the openings into the housing holes wherein a molding flash is formed in inlets of the filler when the filler is injected through an inlet port of a mold; and
   end plates fixed to the end faces, wherein
   the end plates have through-holes at positions facing the inlets of the filler, and each of the through-holes are at positions facing the molding flash.

2. The rotor according to claim 1, wherein an internal dimension of the through-hole is larger than an external dimension of the molding flash formed at the inlet.

3. The rotor according to claim 1, wherein an internal dimension of the through-hole is smaller than an internal dimension of the opening.

4. The rotor according to claim 1, further comprising:
   magnet holding parts in the housing holes that hold the magnets,
   wherein the filler fixes the magnets inside the magnet holding parts, and
   wherein the molding flash protrudes into the through-hole without contacting the end plate.

\* \* \* \* \*